United States Patent
Miranda Camino et al.

[11] Patent Number: 5,671,579
[45] Date of Patent: Sep. 30, 1997

[54] DISPLAY HAVING MODULAR ELEMENT STRUCTURE

[75] Inventors: Santiago Miranda Camino; Perry Allan King, both of Milan; Andrea Secco; Lorenzo Secco, both of Dosson Di Casier, all of Italy

[73] Assignee: Applicazioni S.R.L., Dosson Di Casier, Italy

[21] Appl. No.: 615,176
[22] PCT Filed: Oct. 14, 1994
[86] PCT No.: PCT/EP94/03484
   § 371 Date: Apr. 3, 1996
   § 102(e) Date: Apr. 3, 1996
[87] PCT Pub. No.: WO95/10677
   PCT Pub. Date: Apr. 20, 1995

[30] Foreign Application Priority Data

Oct. 15, 1993 [IT] Italy ................................ VE93A0028

[51] Int. Cl.⁶ ........................................... A47F 5/10
[52] U.S. Cl. ................... 52/653.1; 52/646; 52/653.2; 52/655.1; 52/36.1; 52/239; 403/188; 403/195; 403/199; 403/217; 403/232.1
[58] Field of Search ................... 52/648.1, 646, 52/653.1, 653.2, 655.1, 36.1, 239; 403/217, 188, 195, 199, 232.1

[56] References Cited

U.S. PATENT DOCUMENTS 2,962,170  11/1960  Best .
3,837,754  9/1974  Malcik ............................. 403/217
5,037,232  8/1991  Pakdipanichpong ............ 403/199
5,111,631  5/1992  Flood et al. .
5,127,759  7/1992  Orbom ....................... 52/655.1 X
5,305,571  4/1994  Trevino ............................ 52/653.2

FOREIGN PATENT DOCUMENTS 0026166  4/1981  European Pat. Off. .
4213722  10/1993  Germany .
582848  12/1976  Switzerland .

*Primary Examiner*—Christopher T. Kent
*Attorney, Agent, or Firm*—Hoffman, Wasson & Gitler

[57] ABSTRACT

A display having a modular element structure, including a tubular upright provided with a base and having at least one recess, pointed in at two longitudinally separate portions embracing the upright, each of the portions being provided with a projection complimentary to the recess, a threaded band of one portion meeting with a threaded band of the other portion when these are combined to form the collar, and then outwardly projecting lower band. The display also includes a tubular sleeve mountable over the collar from above and resting on all of the projecting band via a complimentary portion, the height of the sleeve being such as to leave the threaded band upwardly free, a plurality of beams fixed at least one end and an end piece which is provided with a device for hooking it to the tubular sleeve, and the ring nut which screws on to the threaded portion of the collar positions it so as to lock the end piece of the beam to the sleeve.

19 Claims, 4 Drawing Sheets

DISPLAY HAVING MODULAR ELEMENT STRUCTURE

FIELD OF THE INVENTION

This invention relates to a modular element structure for display spaces.

DESCRIPTION OF THE PRIOR ART

In creating display spaces for the most varied requirements in the commercial field, structures of different characteristics and of correspondingly different effect are currently used.

A known structure of this type comprises a plurality of standardized lattices joined together at nodes to form a complex of uprights add beams extending in space in accordance with a predetermined pattern.

A drawback of this arrangement is that the standardized dimensions of the lattice or lattices place obvious constraints on the spatial structure formable with them.

A further drawback is that for connecting the lattices together, special connection elements or joints operable only with tools are required.

A further drawback is that the lattices must be assembled and fixed simultaneously, with evident little margin for manoeuvre in forming the structure.

A further known structure comprises a plurality of tubular bars which can be connected together at 90° by joints, generally of ball type, to form a structural complex in space in accordance with a predetermined pattern.

A drawback of this arrangement is that it uses tubes of circular cross-section, which can be an obstacle in hiding cables which have to reach external equipment.

A further drawback is that the maximum number of elements converging towards one node is limited to two or three, according to the joint configuration, this considerably limiting the structure configurations obtainable.

Another known structure comprises a plurality of tubular beams screwed by their threaded ends to connection elements generally of ball shape.

A drawback of this arrangement is that the need to thread the ends of the tubular beams and hence the need to predetermine their dimensions places obvious limits on the spatial structure formable with them.

A further drawback is that it is not possible to work on intermediate elements of the structure, so that even if it requires only a minimum modification it has to be disassembled to such an extent that the intermediate element becomes an external element of the structure.

Another known structure comprises a plurality of panels variously arranged in space and connected together either directly or by metal structural sections.

A drawback of this arrangement is that the panels are not independent of the support structure and place material limitations on the number of configurations obtainable.

EP-A-0026166 discloses a device for attaching a second component to a first component in a secure but simple manner, yet which will allow the components to be dismantled. The application is particularly suited when the first component is in the form of an upright and when the second component is in the form of a handrail, direction sign, screen, etc., which may be attached to the handrail.

BRIEF SUMMARY OF THE INVENTION

An object of the invention is to provide a modular element structure which eliminates the drawbacks jointly and separately encountered in known structures while at the same time combining their merits.

A particular object of the invention is to provide a structure for display spaces using modular elements which can be rapidly assembled without having to use specialized personnel.

A further object of the invention is to provide a structure in which the individual elements can be easily fitted together without requiring any tool.

A further object of the invention is to provide a structure which while using a very small number of components enables different configurations to be obtained in relation to the particular display requirements.

A further object of the invention is to provide a structure which can be completely electrified while at the same time having the electric cables substantially hidden from view.

A further object of the invention is to provide a structure in which the configuration can be modified if operational requirements change.

A further object of the invention is to provide a structure the external appearance of which is pleasant and of extremely simple line.

All these objects and further ones which will result from the following description are attained according to the invention through a modular element structure for display spaces comprising:

- a tubular upright provided with a base and comprising at least one recess,
- a collar formed in at least two longitudinally separate portions embracing said upright, each of said portions being provided with a projection complementary to said recess, a threaded band of one portion mating with a threaded band of the other portion when these are combined to form said collar, and an outwardly projecting lower band,
- a tubular sleeve mountable over said collar from above and resting on said projecting band via a complementary portion, the height of said sleeve being such as to leave said threaded band upperly free,
- a plurality of beams carrying fixed to at least one end an endpiece provided with means for its hooking to said tubular sleeve,
- a ring nut screwable onto said threaded portion of said collar into a position such as to lock said endpiece of said beam to said sleeve.

BRIEF DESCRIPTION OF THE DRAWINGS

A preferred embodiment of the present invention is further described hereinafter with reference to the accompanying drawings, in which.

DESCRIPTION OF PREFERRED EMBODIMENTS

Figure 1:
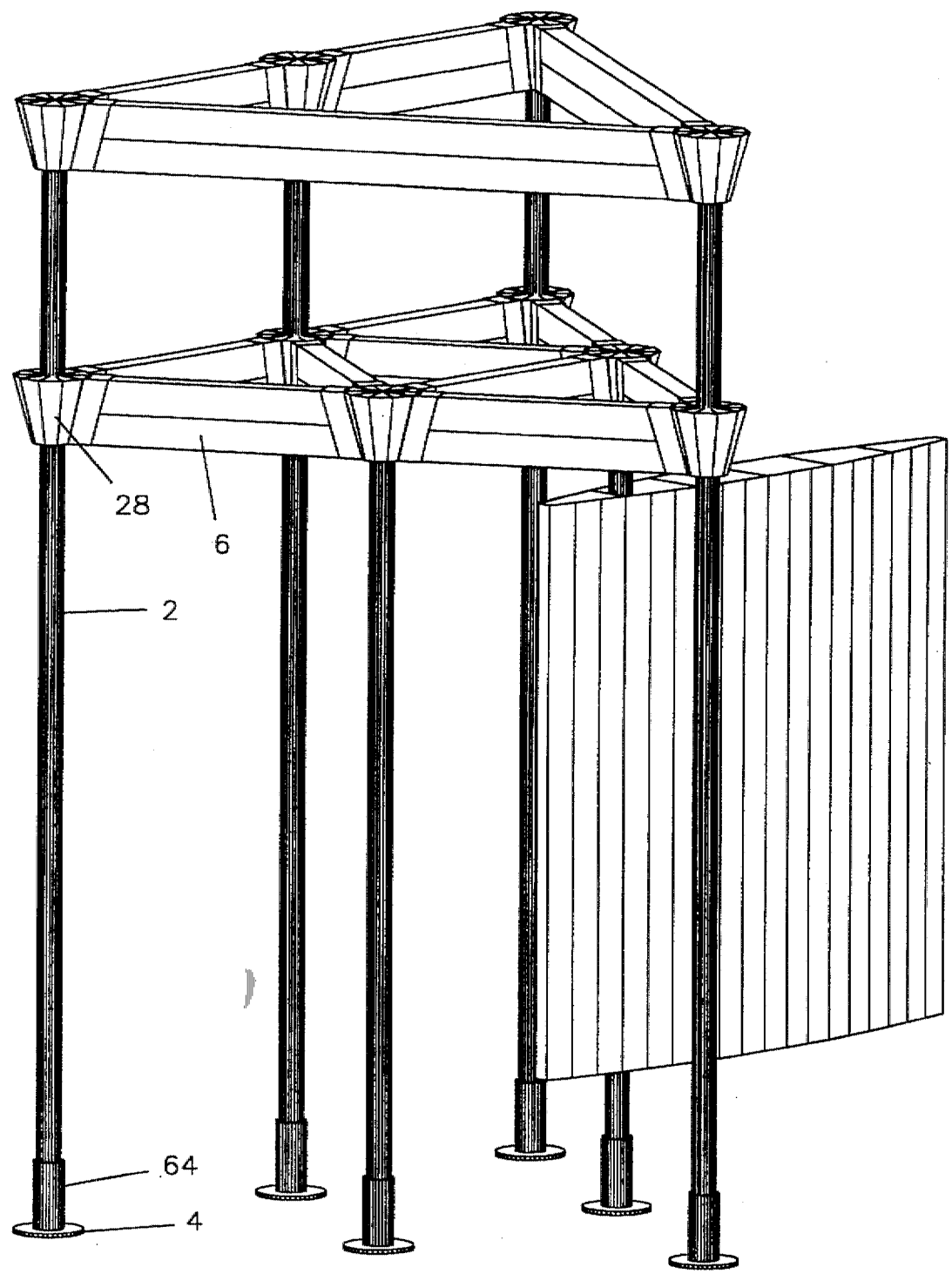
FIG. 1 is a perspective view of a composition example of a modular structure according to the invention.
Figure 2:
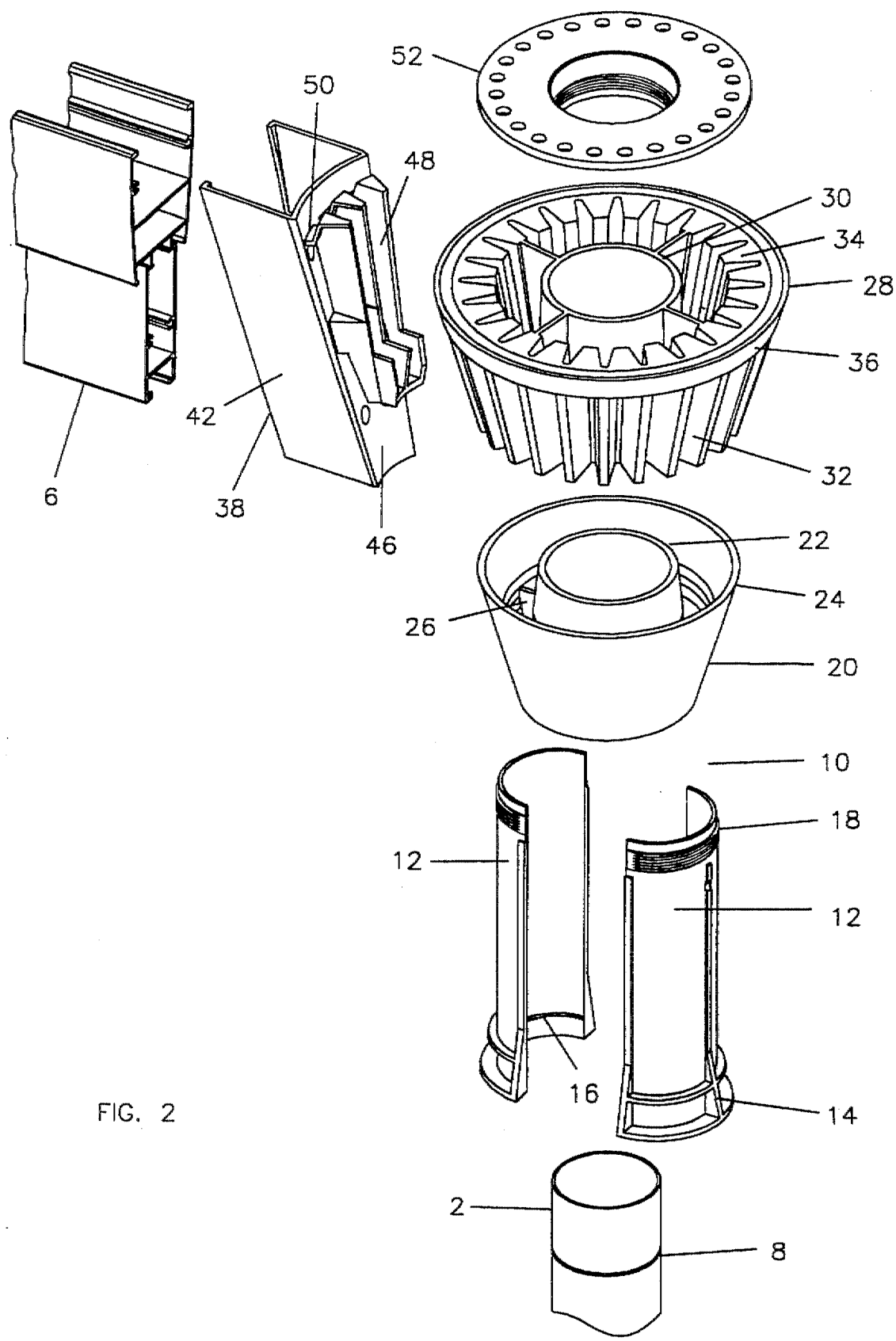
FIG. 2 is a detailed exploded perspective view of the connection between a beam and an upright of the modular structure.
Figure 4:
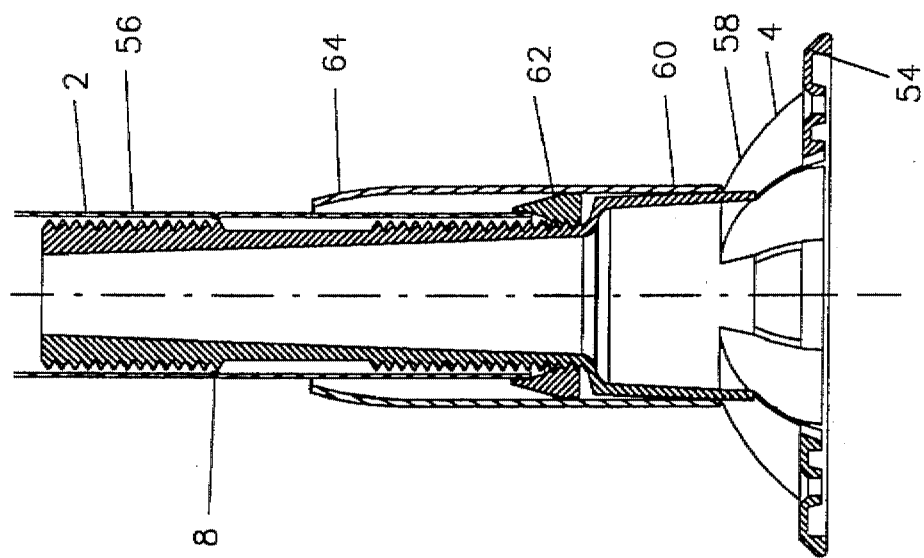
FIG. 4 is a detailed vertical section through the connection between an upright and the respective base.
Figure 3:
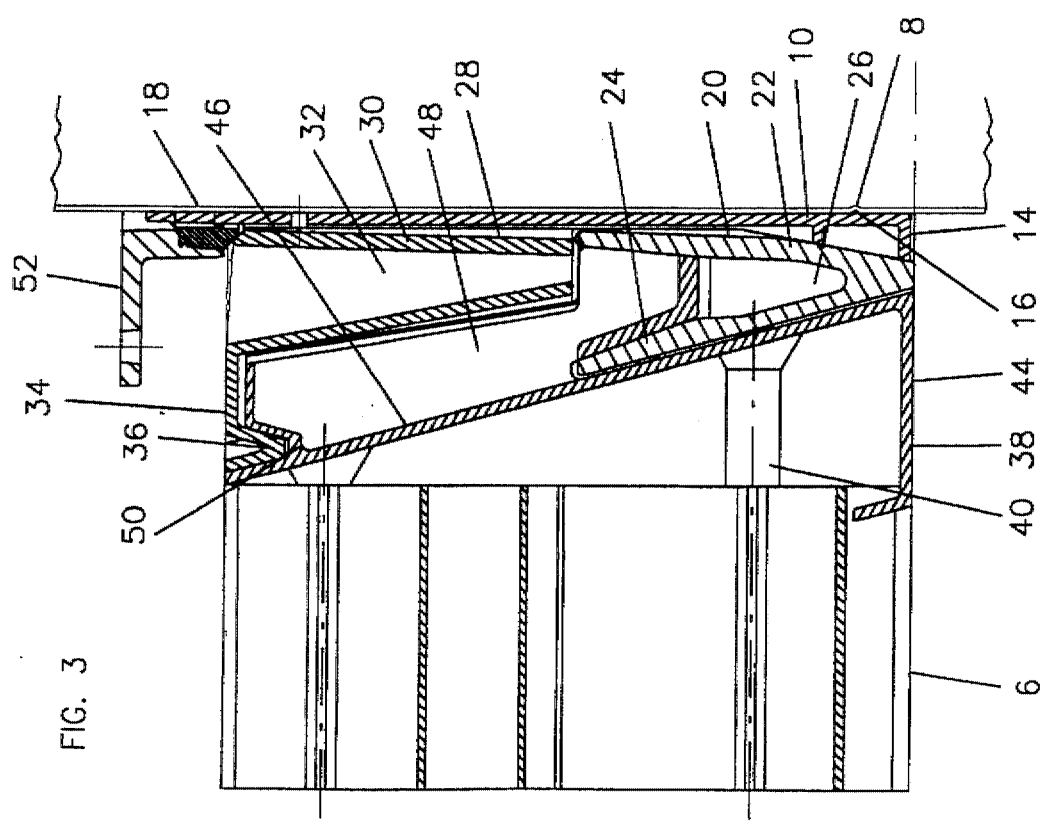
FIG. 3 is a vertical section through the assembled connection taken on the upright axis.
Figure 5:
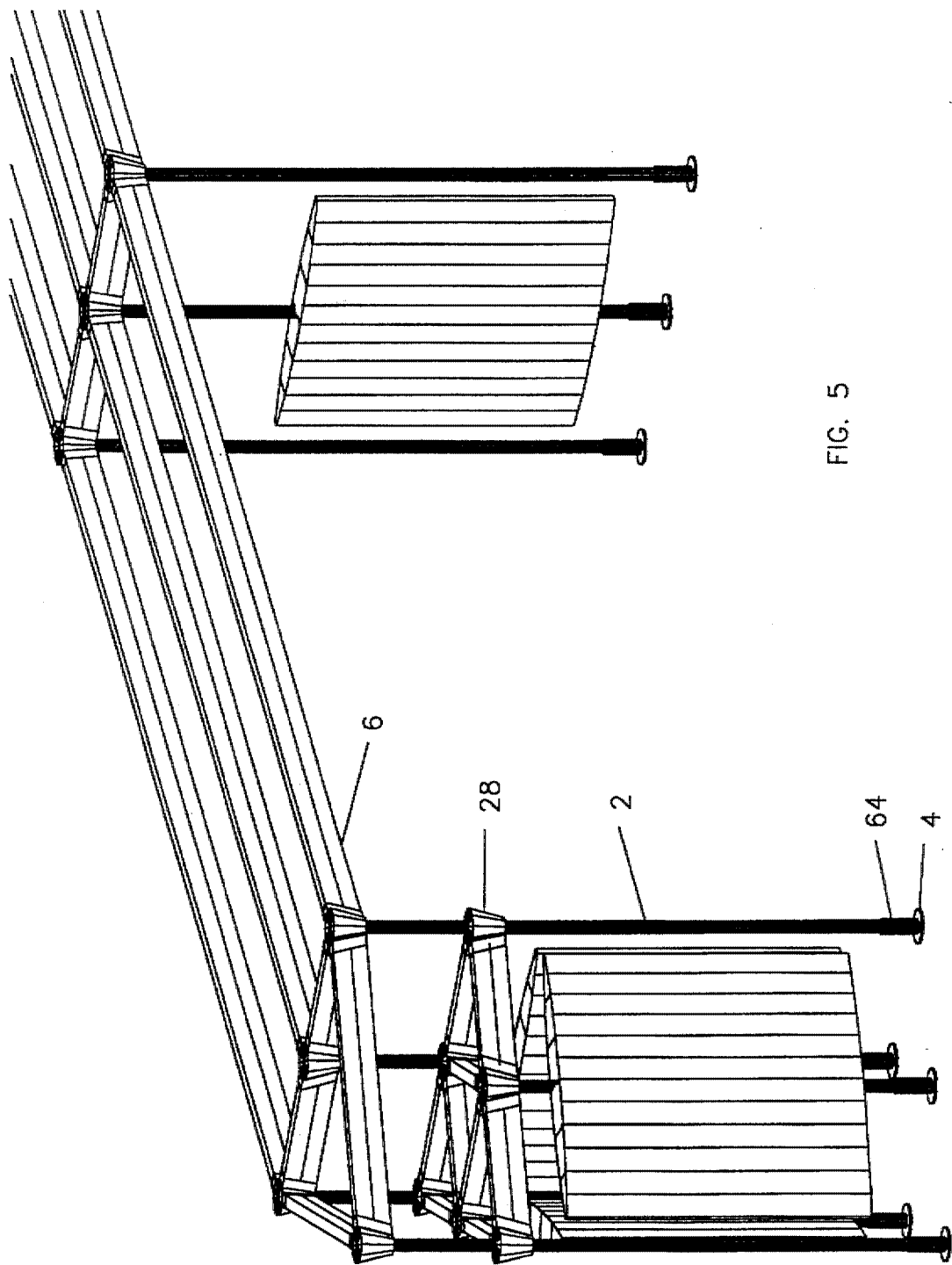
FIG. 5 shows a further composition example.

As can be seen from the figures, the modular structure according to the invention comprises a tubular upright or column 2, preferably of metal construction, provided at the level scheduled for its connection to beams 6 with a plurality of equidistant circumferential grooves 8 preferably formed by roll forming.

A second element of the structure according to the invention consists of a collar, indicated overall by 10 and formed from two longitudinally separate identical portions 12 which can be combined to totally embrace the upright 2. Each of the two portions comprises a downwardly diverging lower band 14 having on its inner surface a rib 16 complementary to the groove 8 provided in the upright 2. Each of the two portions 12 also comprises an upper threaded band 18, which mates with the corresponding band of the other portion when both are combined to embrace the upright 2.

A third element of the structure according to the invention consists of a sleeve 20 formed from two coaxial tubular portions, namely an internal portion 22 of substantially cylindrical shape with its inner diameter just greater than the outer diameter of the collar 10 and with a flared lower band substantially complementary to the flared band 14 of said collar, and an external portion 24 of inverted frusto-conical shape.

The two portions 22,24, which are of equal height but less than the height of the collar 10, are joined together by radial webs 26 which connect together the lower band of said portions while leaving the upper band completely free.

A fourth element of the structure according to the invention consists of a cap 28, which comprises an internal tubular portion 30 of substantially cylindrical shape and inner diameter just greater than the outer diameter of the collar 10, and an external ring comprising a plurality of radial fins 32 joined together at their top by an annular ring 34, the edge 36 of which is bent downwards. The height of the cap 28 is such that when added to the height of the sleeve 20 the result is equal to the height of the collar 10 less its threaded upper band 18. The fins 32 have their outer edge inclined to such an extent that their enveloping surface upwardly extends the external frusto-conical portion 24 of the sleeve 20.

A fifth element of the structure according to the invention consists of a ring nut 52 which can be screwed onto the threaded band 18 of the collar 10.

A sixth element of the structure according to the invention consists of the base 4 for the upright 2. This base comprises an annular portion 54 for resting on the floor, a threaded sleeve 56 insertable into the lower end of the upright 2 and extending lowerly as a slightly flared portion 60, a plurality of radial pieces 58 connecting said annular portion 54 to said tubular sleeve, an adjustment ring nut 62 which can be screwed onto said sleeve to receive and support the lower edge of the upright 2, and a tubular cover jacket 64.

A seventh element of the structure according to the invention consists of the beam 6. This consists of a hollow section bar, constructed for example of extruded aluminium alloy, and carries applied to both its ends an endpiece 38 which is fixed to the beam by screws 40.

Each endpiece 38 comprises two lateral walls 42 which at least partly adhere to the lateral walls of the section bar forming the beam 6, a bottom wall 44, and a front wall 46 in the form of a sector of a frusto-conical surface which in the manner stated hereinafter can be made to adhere to the sleeve 20 and cap 28 when superposed one on the other.

From the front wall 46 of the endpiece 38 there extend fins 48 angularly spaced apart to an extent complementary to the fins 32 of the cap 28 and shaped as a hook so as to engage in the edge of the external portion 24 of the sleeve 20.

Where the top of the fins 48 joins the front wall 46, said fins comprise a notch 50 to be engaged by the bent edge 36 of the annular ring 38 which upperly connects the radial fins 32 of the cap 28 together.

In reality the strucutre according to the invention comprises a plurality of elements of the aforedescribed type, and specifically a plurality of uprights 2 and a plurality of beams 6 which can be joined to each upright 2 in the required number and arrangement.

To form the modular structure according to the invention from the various elements, said structure should firstly be completely defined in terms of its spatial configuration, ie the plan-view position of its uprights 2 should be defined. To position each upright the base 4 is firstly rested on the floor, then the ring nut 62 is screwed along its sleeve 56 as far as the level at which the upright 2 is to rest on it, after which it is all covered by the tubular jacket 64 which, previously mounted on the upright 2, is slipped down until it rests on the radial pieces 58 of the base 4. It should be noted that centering of the tubular jacket 64 on the base 4 is provided by the interaction between the outer surface of the ring nut 62 and the inner surface of the tubular jacket 64, whereas centering of the upright 2 on the base is provided by the interaction between the lower end of the upright 2 and the inner annular cavity of the ring nut 62 plus the interaction between the lower groove 8 of the upright 2 and the outer surface of the threaded sleeve 56.

The two portions 12 which together form the collar 10 are then applied to each upright in correspondence with the prechosen groove 8. While these two portions 12 are being temporarily retained by hand on the upright 2, the sleeve 20 is slid down over it from the top so that it rests with its lower flared band on the diverging band 14 of the collar 10 to hence retain the two portions 12 together and be supported by these without being able to undergo axial movement along the upright 2, as a result of the engagement between the rib 16 and the groove 8.

The beams 6 are then fixed to the sleeve 20 in the predetermined number and angular arrangement. For each beam the relative endpiece 38 is hooked by the fins 48 to the inner surface of the frusto-conical part 24 of the sleeve 20.

The cap 28 is then placed on the sleeve 20, to rest with its bent edge 36 in the notch 50 of the fins 48 of the endpiece 38 which has been previously hooked to the sleeve 20.

The ring nut 52 is then screwed onto the threaded band 18 of the collar 10 to hence securely fix together the upright 1, the collar 10, the sleeve 20, the endpiece 38 and the cap 28, and prevent their mutual disengagement.

If several beams are to be fixed to one and the same upright 2, the cap 28 is positioned after all the endpieces 38 have been hooked to the sleeve 20, so that all the beams are simultaneously fixed by operating the single ring nut 52.

In order to achieve a large number of possible arrangements of the beams 6 relative to the upright 2, the cap 28 is provided with twenty-four fins 32, which are thus spaced apart by an angle of 15° and enable the beams to be positioned with contained angles which are a multiple of this value.

When the beams 6 have been fixed to the upright 2, the other uprights can be treated in the same manner to finally obtain a structure of the predetermined configuration and size. Panels and other accessories can then be applied to the uprights 2 of the beams 6 in conventional manner to form the desired display space.

If the structure is to be electrified, the cables can be laid to rise from the floor through the interspaces present between the radial pieces 58 and the threaded sleeve 56, then through the interior of the uprights and from there through the sleeve 20, the cap 28 and the ring nut 52 into the beams 6, from which they can be connected to the user electrical equipment to be connected to them.

From the aforegoing it is apparent that the modular element structure for display spaces according to the invention has numerous advantages over traditional structures used for the same purpose, and in particular:

- a uniform loading capacity over the entire circumference of each node,
- the facility for fixing several beams to one and the same upright by a single operation and without tools, and consequently the ability to achieve a high assemlby rate,
- secure fixing of several beams to one and the same upright by two separate support and clamping stages,
- considerable flexibility of use, to hence achieve practically any spatial configuration,
- the capability of expanding a pre-existing structure without any limitation and the possibility of modifying it by operating on only those elements concerned in the modification,
- the facility for changing the level of the beams without demounting the entire structure,
- the facility for fixing several beams to one and the same upright at different levels, making it possible to form structures with beams positioned at different levels,
- total electrification of the structure while maintaining the electric cables practically hidden from view,
- the possibility of cutting the beams to size in relation to requirements and then applying the endpieces to them, and of cutting the uprights to size.

We claim:

1. A modular element structure for display spaces comprising:
   a tubular upright provided with a base and comprising at least one recess,
   a collar formed in at least two longitudinally separate portions embracing said tubular upright, each of said separate portions being provided with a projection complimentary to said recess, a threaded band of one of said separate portions mating with a threaded band of another of said separate portions when said separate portions are combined to form said collar, and an outwardly projecting lower band,
   a tubular sleeve mountable over said collar from above and resting on said projecting lower band via a complimentary portion, a height of said tubular sleeve being such as to leave said threaded band upperly free,
   a plurality of beams provided, at least at one end, with an endpiece provided with hooking means to attach to said tubular sleeve, and
   a ring nut engageable with said threaded band to lock said endpiece of said beam to said tubular sleeve.

2. A structure as claimed in claim 1, wherein said tubular upright is of cylindrical shape.

3. A structure as claimed in claim 2, wherein said recess consists of a circumferential groove.

4. A structure as claimed in claim 1, comprising a plurality of recesses equidistant in a length direction of the tubular upright.

5. A structure as claimed in claim 1, wherein said lower band of each of said separate portions of said collar diverges downwards.

6. A structure as claimed in claim 1, wherein said tubular sleeve is formed in two separate parts, an upper part of said separate parts, comprising an external ring with seats complimentary to said hooking means for said, and a lower part endpiece of said beam.

7. A structure as claimed in claim 6, wherein said upper part comprises a plurality of angularly equidistant seats provided along an entire circumference of said upper part.

8. A structure as claimed in claim 6, wherein said hooking means for said endpiece interact respectively with an annular portion of said lower part and with an edge of said upper part of said sleeve.

9. A structure as claimed in claim 1, wherein each beam consists of a section bar carrying at both ends said endpiece, which is fixed to said beam by screws.

10. A structure as claimed in claim 1, wherein each beam consists of an upperly open section bar.

11. A structure as claimed in claim 1, wherein each beam has a height substantially equal to a height of said end piece and to said height of said tubular sleeve.

12. A structure as claimed in claim 8, wherein said endpiece is provided with fins engageable in said edge of said annular portion of said tubular sleeve, said fins being provided upperly with a notch engageable by said edge of said tubular sleeve.

13. A structure as claimed in claim 12, wherein said ring nut acts on said upper part of said tubular sleeve to engage an edge of said ring in said notch provided in said endpiece.

14. A structure as claimed in claim 1, wherein said base comprises an annular portion for resting on a floor, a threaded sleeve insertable into a lower end of said tubular upright, and an adjustment ring nut which can be threaded onto said tubular sleeve to receive and support a lower edge of said tubular upright.

15. A structure as claimed in claim 14, wherein said base is provided with a tubular cover jacket.

16. A structure as claimed in claim 14, wherein a plurality of radial pieces being provided connecting said annular portion and said threaded sleeve together.

17. A structure as claimed in claim 16, wherein said tubular cover jacket rests freely on said radial pieces.

18. A structure as claimed in claim 17, wherein said tubular cover jacket is centered on said base by an interaction between an outer surface of said ring nut and an inner surface of said tubular cover jacket.

19. A structure as claimed in claim 15 wherein said tubular upright is maintained centered on said base by an interaction between said lower end of said tubular upright and a cavity of said ring nut and an interaction between said recess and an outer surface of said threaded sleeve.

* * * * *